Figure 1:
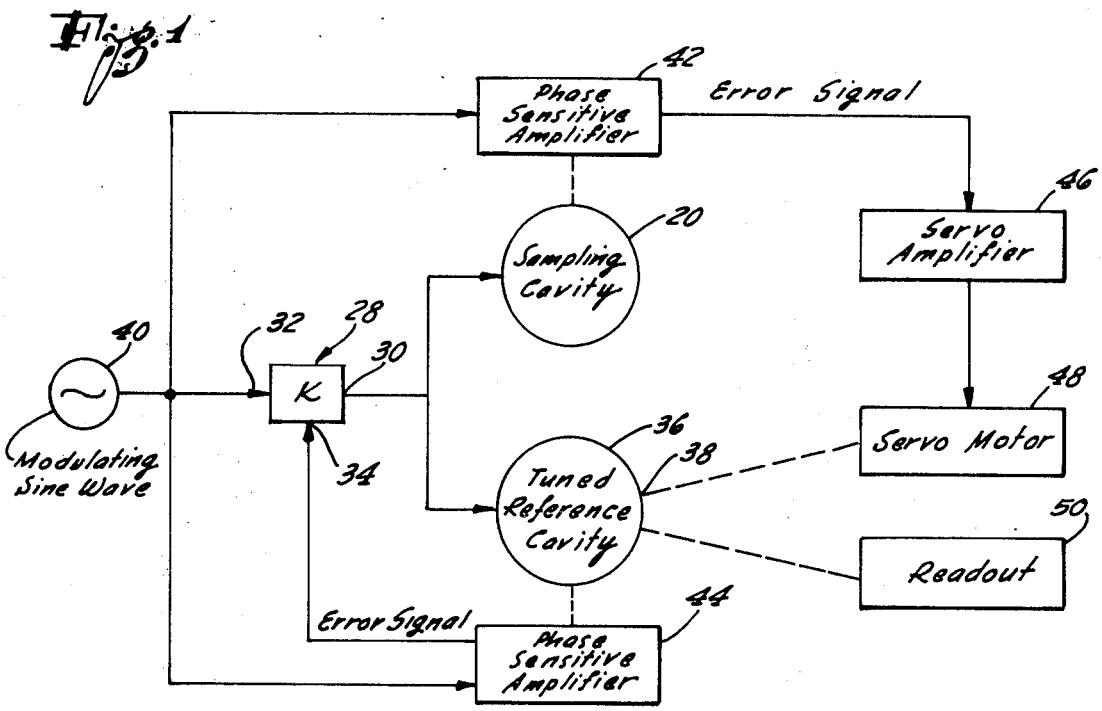

United States Patent

[11] 3,577,071

| [72] | Inventor | Jack T. Collins<br>Boulder, Colo. |
|---|---|---|
| [21] | Appl. No. | 789,203 |
| [22] | Filed | Jan. 6, 1969 |
| [45] | Patented | May 4, 1971 |
| [73] | Assignee | Automation Industries, Inc.<br>Century City, Calif.<br>Continuation of application Ser. No.<br>573,252, Aug. 18, 1966, now abandoned. |

[54] MICROWAVE MATERIAL TESTER
2 Claims, 4 Drawing Figs.

| [52] | U.S. Cl. | 324/58.5 |
|---|---|---|
| [51] | Int. Cl. | G01r 27/04 |
| [50] | Field of Search | 324/58, , 58.5, 95 |

[56] References Cited
UNITED STATES PATENTS

| 2,489,092 | 11/1949 | Larrick | 324/58.5 |
|---|---|---|---|
| 2,792,548 | 5/1957 | Hershberger | 324/58.5 |
| 2,964,703 | 12/1960 | Sargent et al. | 324/58.5 |
| 3,102,232 | 8/1963 | Leonard et al. | 324/58.5 |

*Primary Examiner*—Rudolph V. Rolinec
*Assistant Examiner*—Ernest F. Karlsen
*Attorney*—Dan R. Sadler ABSTRACT: A nondestructive testing device is described wherein a workpiece is coupled to a microwave resonant cavity. In addition to the sampling cavity, a tuneable reference resonant cavity may be employed. A modulated tuneable klystron energizes both resonant cavities. A first phase-sensitive amplifier, responsive to the test cavity, controls a servosystem tuning the reference resonant cavity while a second phase-sensitive amplifier responsive to the reference resonant cavity tunes the klystron so that both cavities and the klystron are tuned alike after coupling of the workpiece. A digital readout is provided to indicate the tuning of the reference cavity. Alternatively, a single resonant cavity is coupled to a swept frequency klystron, with a filamentary workpiece passed through the cavity. The resultant Q of the cavity, and changes in resonant frequency thereof are indicated by an oscilloscope display.

INVENTOR:
Jack T. Collins

AGENT

INVENTOR:
Jack T. Collins

By Jerome B Rockwood
AGENT

MICROWAVE MATERIAL TESTER

This application is a continuation of application Ser. No. 573,252 filed Aug. 18, 1966 now abandoned, by Jack T. Collins, and entitled "Microwave Material Tester."

In many types of nondestructive testing some form of energy, such as magnetic, ultrasonic, infrared, X-ray etc. is coupled into or through a workpiece and the manner in which the energy and the workpiece react is observed. More recently it has been proposed to utilize electromagnetic energy in the form of so-called microwaves for making such tests. Heretofore, microwave energy has been utilized in much the same fashion as the other forms of energy. More particularly, the microwave energy has been transmitted onto or through the workpiece and the manner in which it has been attenuated, reflected or refracted etc. has been measured. Also in some types of tests the manner in which standing waves are set up or maintained is observed.

The use of microwave energy in the foregoing manner has made it possible to determine certain types of characteristics of the workpiece. However microwave and other forms of energy have not been suitable for detecting several important characteristics, such as surface conditions, the chemical composition of a material, the progress of a chemical reaction etc. It will thus be seen the usefulness of the prior microwave and other forms of nondestructive testing systems have been somewhat limited and not entirely well suited for some types of applications.

The present invention provides means for overcoming the foregoing difficulties. More particularly the present invention provides means for utilizing microwave energy or high frequency electromagnetic energy for sensing characteristics of a workpiece which have not been possible before.

This is accomplished by providing a microwave nondestructive tester capable of coupling electromagnetic energy onto or through a workpiece whereby various characteristics, such as the condition of the surface or a plating or coating on the surface and various internal characteristics such as dielectric constants, chemical compositions etc. can be determined.

In the limited number of embodiments disclosed herein this is accomplished by providing a microwave nondestructive tester having a tuned circuit such as a resonant cavity that can be coupled to the workpiece. When the cavity is coupled to the workpiece the characteristics of the cavity, for example its resonant frequency or Q, become a function of one or more characteristics of the workpiece. The tester also includes means responsive to the characteristics of this circuit whereby the characteristics of the workpiece can be indicated.

Figure 2:
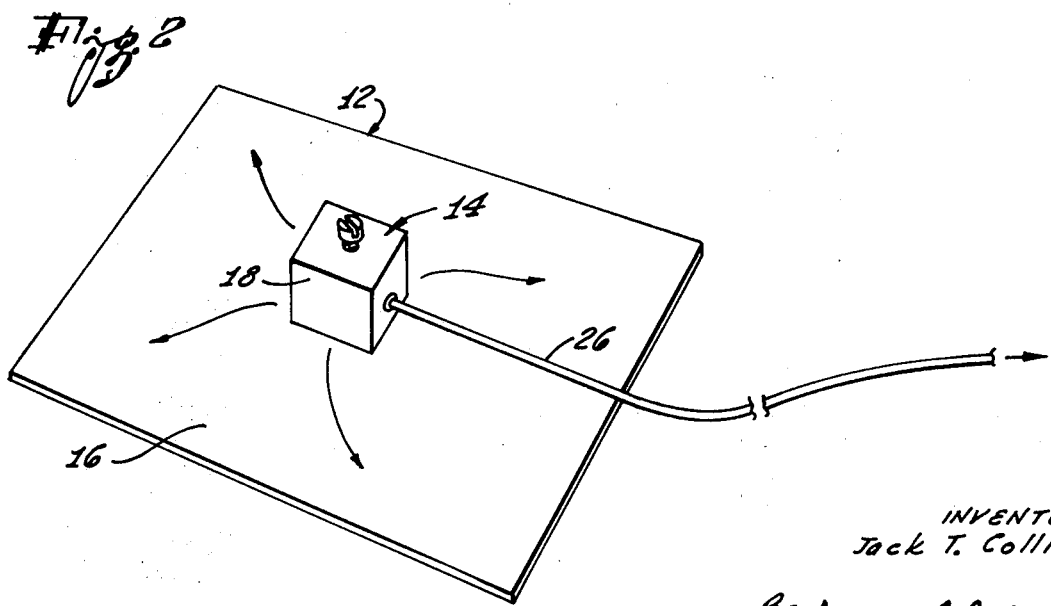
Figure 3:
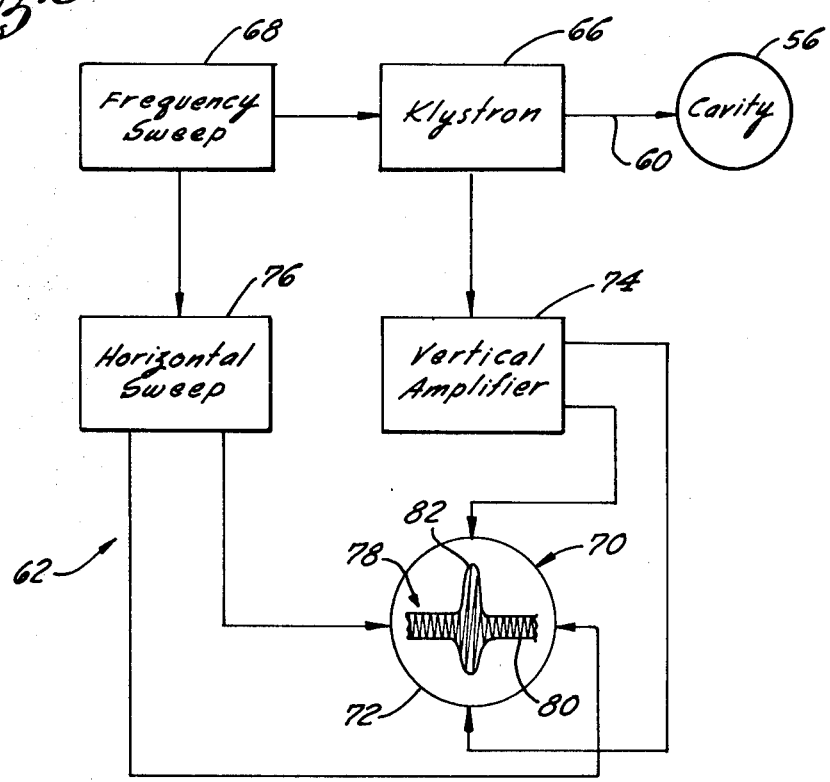
Figure 4:
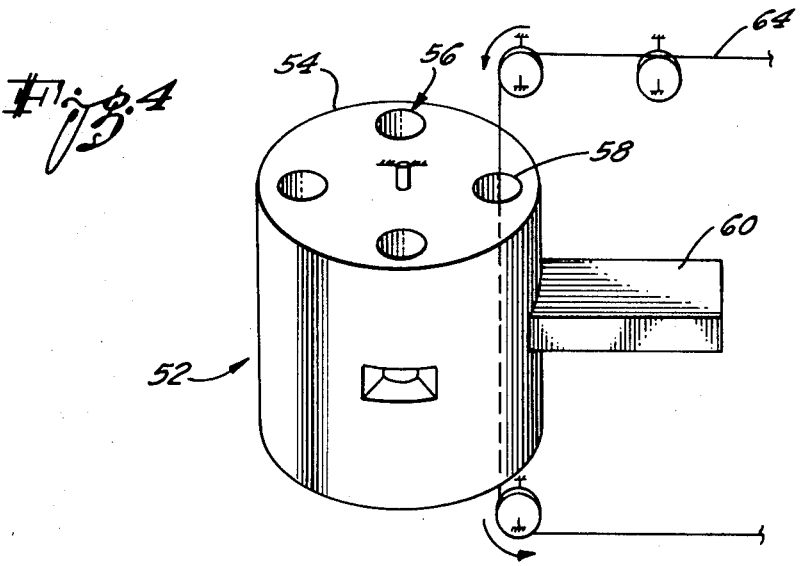

These and other features and advantages of the present invention will become readily apparent from the following detailed description of the limited number of embodiments disclosed herein particularly when taken in connection with the accompanying drawings wherein:

FIG. 1 is a block diagram of a nondestructive tester utilizing one form of the present invention, FIG. 2 is a perspective view of one form of search unit suitable for testing one type of workpiece for one type of characteristic, FIG. 3 is a block diagram of a nondestructive tester utilizing another form of the present invention, and FIG. 4 is a perspective view of another form of search unit suitable for testing another form of workpiece for another type of characteristic.

Referring to the drawings in more detail and particularly to FIG. 1, the present invention is particularly adapted to be embodied in a microwave nondestructive tester 10 for inspecting a workpiece 12 shown in FIG. 2. The tester 10 is adapted to be coupled to a search unit 14 for scanning a workpiece 12. The search unit 14 includes a circuit which is responsive to one or more unknown characteristics of the surface 16.

Although any suitable circuitry may be used it is normally of a resonant nature whereby even relatively minor variations in the characteristics of the circuit may be easily detected. The resonant characteristics of the circuit, among other things, includes the resonant frequency and the Q thereof. Q is a FIG. of merit representing the quality of the circuit and the amount of energy lost per cycle. However, it may also be considered as the ratio between reactance and resistance.

The search unit 14 includes a housing 18 that may be hand held or carried by a mechanical scanning mechanism. One side of the housing 18 has a face adapted to slideably engage the test surface 16 during a scanning operation. The resonant circuit is disposed inside of the housing 18 so as to be coupled to the test surface 16 when the face is on the surface 16. The present resonant circuit is in the form of a resonant microwave cavity 20 as shown in FIG. 2, for example. Microwave energy coupled in the cavity will produce standing waves inside of the cavity 20. The magnitude of the standing wave become a maximum at resonance and are largest when the Q is high. The waves cause various electric currents to circulate on the surface of the cavity walls. The resonant frequency of the cavity 20 depends on several factors. It is primarily a function of the dimensions of the cavity 20. However, it is also a function of the characteristics of the walls i.e. smooth or rough, continuous or scratch etc. The Q of the cavity depends upon the electric loses occurring within the cavity. One of the principles losses occurs as a result of the current flowing on the walls and also of any dielectric losses in the material in the cavity.

The present cavity 20 has a generally cubical configuration. Five sides or walls 22 of the cavity 20 are formed by the housing 18. These walls 22 terminate flush with the face so as to form an enlarged opening in the face. When the search unit 20 is placed on the workpiece 12 with the face against the test surface 16, the test surface 16 forms the sixth side or wall of the cavity 20.

It may be seen that since the test surface 16 forms an integral part of the cavity 20 the electrical characteristics of the cavity 20 will be at least partially a function of the test surface 16. If there are variations in the test surface 16 (for example a defective plating, cracks, pitting, corrosion etc.) the resonant frequency and/or the Q of the cavity 20 will vary.

A suitable transmission line 26, such as a flexible coaxial cable or waveguide may be coupled to the cavity 20. This transmission line 26 is effective to propagate microwave energy into the cavity 20 in such a mode that electromagnetic resonance or near resonance is produced within the cavity 20.

In order to determine the characteristics of the cavity 20 in the search unit 14 it is coupled to the tester 10 by means of the transmission line 26. The tester 10 includes means for producing energy of microwave frequency. By way of example this source may include a kylstron 28 having a power output 30 and one or more control inputs 32 and 34. The power output 30 is coupled to the transmission line 26 so as to supply electromagnetic or microwave energy to the cavity 20. The frequency of this energy is normally at or near the resonant frequency of the cavity 20.

In order to determine the characteristics of the sampling cavity 20 they may be compared with a second or reference cavity 36. Toward this end the transmission line 26 is also coupled to the cavity 36 whereby the same energy will be supplied to both cavities 20 and 36. The second cavity 36 has characteristics which are closely mated to those of the first or sampling cavity 20. Preferably the reference cavity 36 is permanently sealed whereby its characteristics will be independent of its environment and will not change with age.

A tuning device, such as a tuning screw 38 may be provided in the reference cavity 36. By adjusting this screw 38 the resonant characteristics and particularly the resonant frequency may be varied.

In order to compare the characteristics of the two cavities 20 and 36 a signal generator 40 may be coupled to one of the inputs 32 of the klystron 28. Normally this generator 40 provides a relatively low frequency sine wave. The sine wave is, in turn, effective to modulate the power from the klystron 28.

A separate phase-sensitive comparator or amplifier 42 and 44 may be coupled to each of the cavities 20 and 36. Each of the amplifiers 42 and 44 is responsive to the modulating sine wave in its respective cavity. Each of the amplifiers 42 and 44 is also coupled to the generator 40 so as to also receive the sine wave therefrom. It can be seen each amplifier 42 and 44 compares the phase of the signal in its respective cavity 20 and 36 with that of the signal from the generator 40. Accordingly two error signals are produced with represent the deviations of the cavities from the reference sine wave.

The first error signal is coupled to a servoamplifier 46 and servomotor 48. The servomotor 48 is, in turn, coupled to the tuning screw 38 in the reference cavity 36. The servomotor 48 is effective to adjust the tuning screw and vary the characteristics of the cavity 36. This adjustment is effective to reduce the error signal from the amplifier 42 to some predetermined level such as zero.

The output of the second amplifier 44 is coupled to control input 34 of the klystron 28. This error signal is effective to alter the frequency of the klystron 28 whereby the magnitude of the second error signal is maintained at some preselected level for example zero.

It will thus be seen that this tester 10 forms a closed loop which is self-stablizing. The frequency of the klystron 28 will be maintained tuned to the resonant frequency of the reference cavity 36. Moreover the servomotor 48 will vary the resonant frequency of the reference cavity 36 so as to maintain it equal to the resonant frequency of the first or sampling cavity 20.

In order to utilize this tester 10 for inspecting a test surface 16, an appropriate search unit 14 is coupled into the tester 10 and the face of the search unit 14 placed on the test surface 16. The klystron 28 will simultaneously couple energy into the reference cavity 36 and the sample cavity 20. The two phase-sensitive amplifiers 42 and 44 will then produce appropriate error signals which will cause the servomotor 48 to adjust the reference cavity 36 so as to track the sample cavity 20 and also adjust the klystron 28 so as to maintain it tuned to the resonant frequency of the reference cavity 36.

A suitable readout 50 may be coupled to the servomotor 48 and/or tuning screw 38 whereby the operator can observe the extent of the adjustments and know the characteristics of the workpiece 12. Alternatively the readout may be coupled to suitable recording and/or automatic control means etc. As the search unit scans the various portions of the test surface 16, any variations in the conductivity of the test surface 16 will produce corresponding variations in the characteristics of the resonant cavity 20. More particularly if there are any cracks, scratches or other discontinuities the resonant frequency of the search unit will be correspondingly effected and indicated by the readout.

The tester 10 is capable of performing the desired type of testing by determining the resonant frequency. However, under some circumstances it may be desirable to sense variations in the Q of the cavity. For example the chemical composition or the progress of a chemical reaction within the workpiece may alter the dielectric losses etc. in the workpiece. This, in turn, will produce material changes in the Q of the cavity.

To determine variations in the Q the tester of FIG. 3 may be utilized. In this embodiment a search unit 52 is provided with includes a resonant circuit for being coupled to the workpiece. The search unit may be the same as, or similar to, the one in FIG. 2 or it may be of any other suitable design. For example, the search unit 52 disclosed in FIG. 4 may be used.

This search unit 52 includes a housing 54 having one or more sampling cavities 56. The cavity 56 extends completely through the housing 54. It is normally of a substantially uniform diameter and forms access openings 58 in the opposite ends of the housing. A suitable power transmission line such as a hollow waveguide 60 may be coupled to the cavity 56 for supplying electromagnetic energy thereto. The energy is coupled into the cavity 56 whereby standing waves may be sustained in the cavity 56 between the two open ends 58.

In this form of tester 62 the workpiece 64 is moved through the access opening 58 and into the interior of the cavity 56.

Normally the workpiece 64 is spaced from all of the conductive surfaces so as not to form a part of any resonant surface. However, since the workpiece 64 is inside of the cavity 56 it is permeated by the electromagnetic energy and will tend to absorb varying amounts of energy depending upon its dielectric losses etc.

This search unit 52 is particularly well adapted for inspecting a long continuous workpiece such as the filament 64. The filament 64 may be a glass fiber having a plastic resin applied thereto. The resin-coated fiber may then be "layed up" on a mandrel or other form to create a larger structure.

It can be appreciated to obtain the optimum structure it is essential that the fiber 64 be coated with the proper amount of resin and that the resin be in the correct portion of its curing cycle. Since the electromagnetic energy permeates the workpiece 64 and since the dielectric losses etc. are a function of the foregoing factors the Q of the cavity 56 is a function of those factors also.

The tester 62 includes a source of electromagnetic energy such as klystron 66 which is coupled to the transmission line 60. The frequency of the klystron 66 is variable over a band of frequencies that includes the resonant frequency of the cavity 56. A frequency control 68 is coupled to the control input of the klystron 66. This control 68 is effective to produce a signal that will cause the frequency of the energy from the klystron 66 to periodically sweep over a band of frequencies that includes all of the frequencies which are normally encountered. Preferably the band of frequencies is centered around the resonant frequency of the cavity 56.

A suitable indicating means 70 may be provided to enable the operator to determine the various characteristics of the cavity 56 and particularly the workpiece 64 therein. In the present instance a cathode ray tube 72 is provided to produce an easily recognizable visual display. However, if desired any form of meter readout or automatic type of control may be provided. The horizontal deflection means in the tube 72 are coupled to the frequency control by a horizontal sweep generator 76. This will cause the electronic beam to scan horizontally across the face of the tube 72 in synchronism with the variations in frequency from the klystron 66.

The vertical deflection means in the tube 72 are coupled to the klystron 66 and/or cavity 56 by means of a vertical amplifier 74. This will cause the electron beam to be deflected vertically as a function of the amount of energy being coupled into the cavity 56 and/or the load on the klystron 66.

The resultant display 78 will be similar to that shown in FIG. 3. Normally it includes end portions 80 of relatively small deflection. A central portion of the peak 82 is a function of the resonant frequency of the cavity. The width of the peak 82 is a function of the Q of the cavity 56. Accordingly if the characteristic being investigated produce variations in the resonant frequency, the position of the vertical peak will vary in the horizontal direction. However if the characteristic produces variations in the Q of the cavity the width of the peak will vary. Accordingly, by observing the width of the peak 82 the operator can monitor the characteristics of the workpiece.

While only a limited number of embodiments have been disclosed herein it will be readily apparent to persons skilled in the art that numerous changes and modifications may be made thereto without departing from the spirit of the invention. For example the design of the search unit may be modified to suit the size, shape and other characteristics of the particular workpieces being tested. The workpiece may be coupled to the cavity by any suitable means. The cavity may be arranged so that the workpiece forms at least a portion of the surfaces of the resonant structure or the entire workpiece or only a portion thereof may be placed within the cavity. The workpiece is coupled to the cavity so that the characteristic thereof being investigated will effect one or more of the electrical characteristics of the cavity. More particularly the cavity may be coupled to the workpiece whereby the surface finish, the electrical conductivity, the dielectric constants, the dimensions, the position etc. of the workpiece will alter the resonant frequency, the Q, the mode of propogation inside the cavity etc. Accordingly the foregoing disclosure and description thereof are for illustrative purposes only and do not in any way limit the invention which is defined only by the claims which follow.

I claim:

1. A nondestructive material tester for testing surface conditions of a workpiece;
   a first microwave cavity resonator having one opening thereon which is adapted to be coupled to one surface of the workpiece to close the cavity of said resonator whereby the resonant frequency of said resonator is altered by the surface condition of the workpiece;
   a second microwave cavity resonator being permanently sealed and including adjusting means mounted therein to change the resonant frequency of said second resonator;
   a signal generator for generating a signal at a reference frequency;
   a source of energy in the microwave frequency, said source being coupled to be responsive to said signal generator and having an output coupled to simultaneously supply microwave energy to said first and said second resonator to cause said resonators to resonate, said source including adjusting means to change the frequency of the energy thereof;
   a first phase-sensitive means being coupled to be responsive to energy from said first resonator and said signal generator and having an output for providing an error signal therebetween;
   a second phase-sensitive means being coupled to be responsive to energy from said second resonator and said signal generator and having an output for providing an error signal of the energy therebetween, the output of said second phase-sensitive means being coupled to the adjusting means of said source for maintaining said source in tune with said second resonator;
   servo means responsive to the error signal output of said first phase-sensitive means and being coupled to the adjusting means of said second resonator for maintaining said first resonator in tune with said second resonator; and
   readout means coupled to be responsive to the changes in frequency of the energy in said second resonator for providing an indication of the surface condition of the workpiece as determined by the changes in frequency.

2. In the nondestructive material tester as defined in claim 1 wherein said source of energy being a klystron.